United States Patent
Suzuki et al.

(10) Patent No.: US 11,062,154 B2
(45) Date of Patent: *Jul. 13, 2021

(54) NON-TRANSITORY STORAGE MEDIUM STORING IMAGE TRANSMISSION PROGRAM, IMAGE TRANSMISSION DEVICE, AND IMAGE TRANSMISSION METHOD

(71) Applicant: TOYOTA JIDOSHA KABUSHIKI KAISHA, Toyota (JP)

(72) Inventors: Koichi Suzuki, Miyoshi (JP); Junichiro Igawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,148

(22) Filed: Mar. 12, 2020

(65) Prior Publication Data

US 2020/0210720 A1 Jul. 2, 2020

Related U.S. Application Data

(63) Continuation of application No. 15/964,681, filed on Apr. 27, 2018, now Pat. No. 10,621,449.

(30) Foreign Application Priority Data

Apr. 28, 2017 (JP) .............................. JP2017-089694

(51) Int. Cl.
*G06K 9/00* (2006.01)
*G08G 1/01* (2006.01)
*H04N 7/18* (2006.01)
*G08G 1/04* (2006.01)
*G08G 1/0962* (2006.01)

(52) U.S. Cl.
CPC ..... *G06K 9/00798* (2013.01); *G06K 9/00791* (2013.01); *G06K 9/00825* (2013.01); *G08G 1/0112* (2013.01); *G08G 1/0133* (2013.01); *G08G 1/04* (2013.01); *G08G 1/09623* (2013.01);

(Continued)

(58) Field of Classification Search
None
See application file for complete search history.

(56) References Cited

U.S. PATENT DOCUMENTS 6,750,902 B1 * 6/2004 Steinberg ............... H04N 7/167
348/211.3
8,400,619 B1 * 3/2013 Bachrach ................. G01C 1/04
356/4.01

(Continued)

FOREIGN PATENT DOCUMENTS

JP 2014-163814 9/2014

OTHER PUBLICATIONS

Notice of Allowance dated Jan. 24, 2020 in U.S. Appl. No. 15/963,375.

(Continued)

*Primary Examiner* — Reza Aghevli
(74) *Attorney, Agent, or Firm* — Oblon, McClelland, Maier & Neustadt, L.L.P.

(57) ABSTRACT

An image transmission device including a communication interface configured to transmit a captured image of a mark target that faces an intersection to a server in a case where the mark target is inconspicuous.

20 Claims, 5 Drawing Sheets

(52) U.S. Cl.
CPC ............. H04N 7/185 (2013.01); H04N 7/188 (2013.01); *G06K 9/00818* (2013.01)

(56) References Cited

U.S. PATENT DOCUMENTS

| | | | |
|---|---|---|---|
| 9,555,803 B2* | 1/2017 | Pawlicki | G01S 11/12 |
| 10,255,670 B1* | 4/2019 | Wu | H04N 7/183 |
| 2004/0016870 A1* | 1/2004 | Pawlicki | G06K 9/52 |
| | | | 250/208.1 |
| 2004/0167667 A1 | 8/2004 | Goncalves | |
| 2007/0026871 A1* | 2/2007 | Wager | H04L 67/16 |
| | | | 455/456.1 |
| 2011/0181872 A1* | 7/2011 | Dold | G01S 17/86 |
| | | | 356/139.04 |
| 2012/0042288 A1 | 2/2012 | Liao | |
| 2014/0085107 A1* | 3/2014 | Gutierrez | G08G 1/096716 |
| | | | 340/905 |
| 2016/0176358 A1* | 6/2016 | Raghu | B60R 1/00 |
| | | | 382/104 |
| 2016/0257308 A1* | 9/2016 | Pawlicki | B60W 30/12 |
| 2017/0046891 A1* | 2/2017 | Trivelpiece | G07C 9/00174 |
| 2017/0160743 A1* | 6/2017 | Schweikl | B60W 30/00 |
| 2017/0186178 A1* | 6/2017 | Nagasaka | H04B 10/116 |
| 2018/0033307 A1* | 2/2018 | Tayama | H04S 7/00 |
| 2018/0113209 A1* | 4/2018 | Campbell | G01S 13/865 |
| 2018/0252539 A1* | 9/2018 | Yunoki | G08G 1/167 |
| 2018/0315304 A1 | 11/2018 | Suzuki et al. | |
| 2018/0324345 A1* | 11/2018 | Liang | H04N 5/232 |
| 2019/0302012 A1* | 10/2019 | Zheng | G01N 21/3586 |
| 2019/0334619 A1* | 10/2019 | Aoyama | G06K 9/2054 |
| 2019/0369593 A1* | 12/2019 | Murakami | H04M 1/12 |
| 2019/0379776 A1* | 12/2019 | Suda | G06F 1/3231 |
| 2019/0381672 A1* | 12/2019 | Hosoi | H04R 1/1016 |
| 2019/0387086 A1* | 12/2019 | Takai | H04M 1/06 |
| 2020/0006988 A1* | 1/2020 | Leabman | A61B 8/56 |

OTHER PUBLICATIONS

U.S. Office Action dated Jul. 5, 2019 in U.S. Appl. No. 15/963,375, 8 pages.

* cited by examiner

| INTERSECTION ID | LATITUDE/LONGITUDE | IMAGE ID | POI |
|---|---|---|---|
| ID001 | F (X1, Y1) | IM001 | POI001 |
| ID002 | F (X2, Y2) | IM002 | POI002 |
| ⋮ | ⋮ | ⋮ | ⋮ |

NON-TRANSITORY STORAGE MEDIUM STORING IMAGE TRANSMISSION PROGRAM, IMAGE TRANSMISSION DEVICE, AND IMAGE TRANSMISSION METHOD

INCORPORATION BY REFERENCE

This application is continuation of U.S. application Ser. No. 15/964,681, filed Apr. 27, 2018, which claims the benefit of priority from Japanese Patent Application No. 2017-089694 filed on Apr. 28, 2017, the entire contents of all of which are incorporated herein by reference in its entirety.

BACKGROUND

1. Technical Field

The present disclosure relates to a non-transitory storage medium storing an image transmission program, an image transmission device, and an image transmission method.

2. Description of Related Art

In the related art, in a case where there is an intersection (hereinafter, referred to as a guide intersection) to be guided, such as right or left turn, in front of a vehicle in a moving direction, guidance of the guide intersection is performed. In the above-described case, mark target candidates that are candidates for a mark target to be a mark are acquired, and in a case where a mark target candidate is used as a mark target in the past, appropriateness of the mark target candidate as a mark is determined based on a visual recognition form of an occupant to the mark target candidates accompanied with passing through the guide intersection. A traveling guidance system configured to perform guidance of the guide intersection using a mark target candidate having appropriateness equal to or greater than a reference value as a mark target among the mark target candidates at the guide intersection based on the determination is known (for example, see Japanese Unexamined Patent Application Publication No. 2014-163814 (JP 2014-163814 A)).

SUMMARY

In the traveling guidance system of the related art, there is no disclosure concerning a method of efficiently collecting data of the mark target candidates. In particular, there is no disclosure concerning efficient data collection at an intersection where collection is not needed.

Accordingly, the disclosure provides a non-transitory storage medium storing an image transmission program, an image transmission device, and an image transmission method capable of efficiently collecting an image at an intersection.

A first aspect of the disclosure relates to a non-transitory storage medium storing an image transmission program that is executed on an in-vehicle device mounted in a vehicle having an imaging unit configured to image surroundings of the vehicle to acquire an image and a communication unit configured to perform communication with an information center. The image transmission program includes an image acquisition step of, in a case where a certain mark target is located at an intersection, and an occupancy ratio of an occupancy area of the mark target in a block of the minimum range divided by a plurality of roads to an area of the block is equal to or less than a given ratio, causing the imaging unit to acquire an image of the intersection including the mark target, and a transmission step of causing the communication unit to transmit the image acquired to the information center. The information center may be, for example, a traffic information center, a probe center, or the like.

For this reason, it is possible to reduce the acquisition amount of images by acquiring an image in a case where the occupancy ratio of the occupancy area of the mark target in the block to the area of the block is equal to or less than the given ratio.

Accordingly, it is possible to provide a non-transitory storage medium storing an image transmission program capable of efficiently collecting an image at an intersection.

In the non-transitory storage medium according to the first aspect of the disclosure, the image acquisition step of the image transmission program may include causing the imaging unit not to acquire the image of the intersection including the mark target in a case where the occupancy ratio is equal to or greater than a given ratio.

For this reason, in a case where the occupancy ratio of the mark target is equal to or greater than the given ratio, determination is made that acquisition of an image is not needed.

Accordingly, it is possible to provide a non-transitory storage medium storing an image transmission program capable of efficiently collecting an image at an intersection by preventing transmission of an image of a large and conspicuous mark target to the information center.

In the non-transitory storage medium according to the first aspect of the disclosure, the image acquisition step of the image transmission program may include causing the imaging unit not to acquire the image relating to the intersection in a case where the mark target occupies the entire area of the block.

For this reason, in a case where the occupancy ratio occupies the entire area of the block, determination is made that acquisition of an image is not needed.

Accordingly, it is possible to provide a non-transitory storage medium storing an image transmission program capable of efficiently collecting an image at an intersection by preventing transmission of an image of a conspicuous mark target occupying the whole of one block to the information center.

In the non-transitory storage medium according to the first aspect of the disclosure, the image acquisition step of the image transmission program may include causing the imaging unit to acquire the image of the intersection including the mark target at a place between a position in front of the intersection by a predetermined distance and the intersection.

For this reason, it is possible to restrict a section where the imaging unit is caused to acquire an image, to a place between a position in front of an intersection by a predetermined distance and the intersection.

Accordingly, it is possible to provide a non-transitory storage medium storing an image transmission program capable of efficiently collecting an image at an intersection by restricting a section where the imaging unit is caused to acquire an image, to a place between a position in front of the intersection by a predetermined distance and the intersection.

In the non-transitory storage medium according to the first aspect of the disclosure, the image acquisition step of the image transmission program may include specifying the occupancy ratio using map data.

For this reason, it is possible to specify the occupancy ratio based on the map data.

Accordingly, it is possible to provide a non-transitory storage medium storing an image transmission program capable of efficiently collecting an image at an intersection using the occupancy ratio specified based on the map data.

In the non-transitory storage medium according to the first aspect of the disclosure, the image acquisition step of the image transmission program may include causing the imaging unit not to acquire the image relating to the intersection in a case where the mark target is a predetermined large facility.

For this reason, determination is made that acquisition of an image of a predetermined large facility is not needed.

Accordingly, it is possible to provide a non-transitory storage medium storing an image transmission program capable of efficiently collecting an image at an intersection by preventing acquisition of an image of a predetermined large facility.

In the non-transitory storage medium according to the first aspect of the disclosure, the block may be positioned at a left front corner of the intersection in left-hand traffic or at a right front corner of the intersection in right-hand traffic.

For this reason, it is possible to prevent acquisition of an image of a mark target at the left front corner of the intersection in left-hand traffic or at the right front corner of the intersection in right-hand traffic, and to prevent transmission of the image to the information center.

Accordingly, it is possible to provide a non-transitory storage medium storing an image transmission program capable of efficiently collecting an image at an intersection by preventing acquisition of an image of a mark target at the left front corner of the intersection in left-hand traffic or at the right front corner of the intersection in right-hand traffic.

A second aspect of the disclosure relates to a non-transitory storage medium storing an image transmission program that transmits a captured image of a mark target to an information center. The image transmission program transmits the image to the information center in a case where the mark target is inconspicuous at an intersection, and does not transmit the image to the information center in a case where the mark target is conspicuous at the intersection.

For this reason, it is possible to reduce the acquisition amount of images by transmitting an image of an inconspicuous mark target at an intersection to the information center.

Accordingly, it is possible to provide a non-transitory storage medium storing an image transmission program capable of efficiently collecting an image at an intersection.

In the non-transitory storage medium according to the second aspect of the disclosure, the case where the mark target is inconspicuous at the intersection may be a case where the mark target is located and an occupancy ratio of an occupancy area of the mark target in a block of the minimum range divided by a plurality of roads to an area of the block is less than a given ratio.

For this reason, it is possible to reduce the acquisition amount of images by transmitting an image of an inconspicuous mark target having an occupancy ratio of an occupancy area occupying a block to an area of the block less than a given ratio at an intersection to the information center.

Accordingly, it is possible to provide a non-transitory storage medium storing an image transmission program capable of efficiently collecting an image at an intersection.

A third aspect of the disclosure relates to an image transmission device that is mounted in a vehicle having an imaging unit configured to image surroundings of the vehicle to acquire an image and a communication unit configured to perform communication with an information center. The image transmission device includes an image acquisition unit configured to, in a case where a certain mark target is located at an intersection, and an occupancy ratio of an occupancy area of the mark target in a block of a minimum range divided by a plurality of roads to an area of the block is equal to or less than a given ratio, cause the imaging unit to acquire an image of the intersection including the mark target, and a transmission controller configured to cause the communication unit to transmit the image acquired to the information center.

For this reason, it is possible to reduce the acquisition amount of images by acquiring an image in a case where the occupancy ratio of the occupancy area of the mark target in the block to the area of the block is equal to or less than the given ratio.

Accordingly, it is possible to provide an image transmission device capable of efficiently collecting an image at an intersection.

A fourth aspect of the disclosure relates to an image transmission method that is executed on an in-vehicle device mounted in a vehicle having an imaging unit configured to image surroundings of the vehicle to acquire an image and a communication unit configured to perform communication with an information center. The image transmission method includes, in a case where a certain mark target is located at an intersection, and an occupancy ratio of an occupancy area of the mark target in a block of a minimum range divided by a plurality of roads to an area of the block is equal to or less than a given ratio, causing the imaging unit to acquire an image of the intersection including the mark target; and causing the communication unit to transmit the image acquired to the information center.

It is possible to provide a non-transitory storage medium storing an image transmission program, an image transmission device, and an image transmission method capable of efficiently collecting an image at an intersection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment to which a non-transitory storage medium storing an image transmission program, an image transmission device, and an image transmission method of the disclosure are applied will be described.

Embodiment

Figure 1:
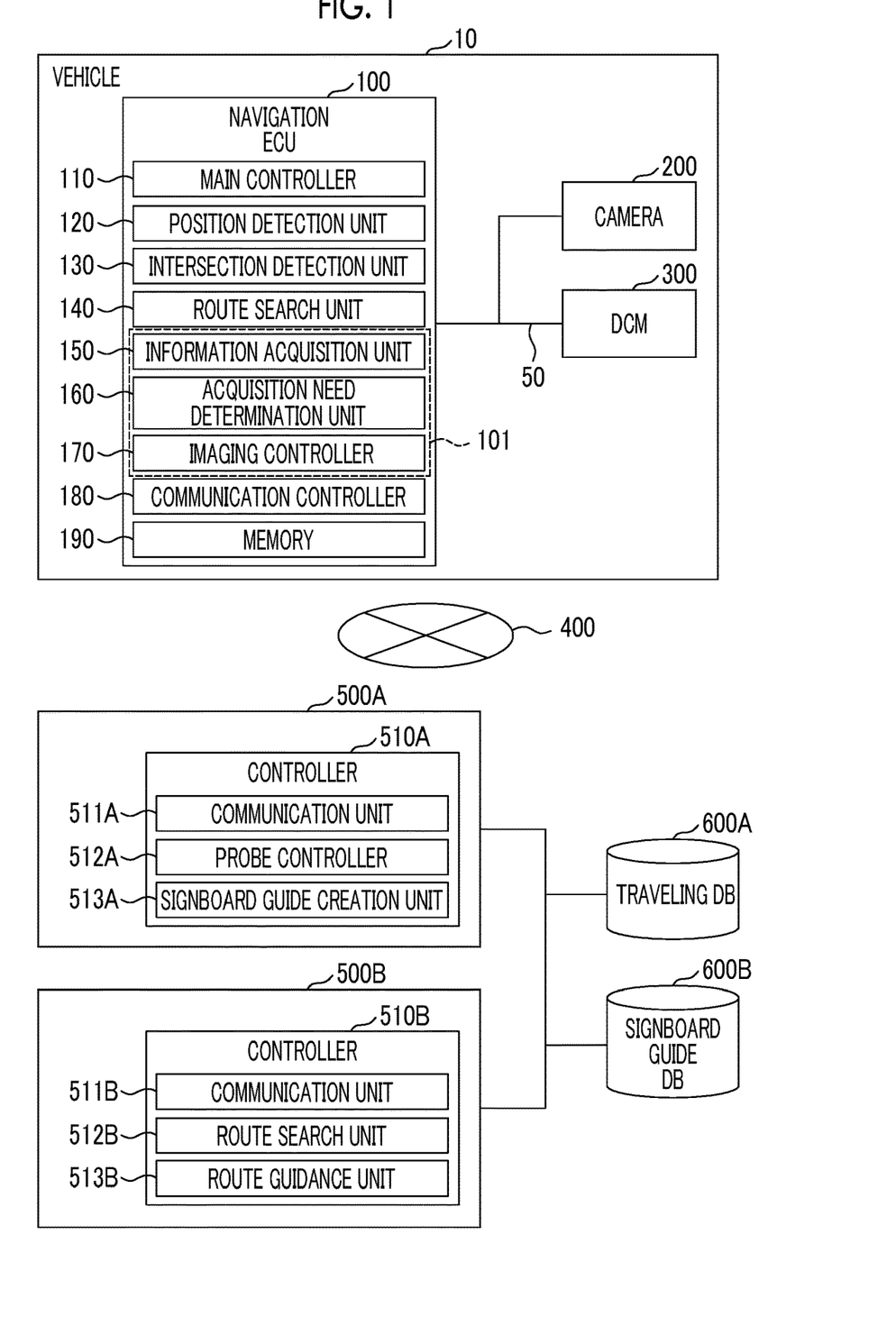
FIG. 1 is a diagram showing the configuration of a route guidance system including a vehicle, a probe storage server, and a navigation server.

FIG. 1 is a diagram showing the configuration of a route guidance system including a vehicle 10, a probe storage server 500A, and a navigation server 500B. In the vehicle 10, a navigation electric control unit (ECU) 100, a camera 200, and a data communication module (DCM) 300 are mounted. The navigation ECU 100, the camera 200, and the DCM 300 are connected to perform communication with one another through a controller area network (CAN) 50 as an example. The navigation ECU 100 can perform wireless data communication with the probe storage server 500A and the navigation server 500B through the DCM 300 and a network 400. The probe storage server 500A and the navigation server 500B are an example of an information center or a data center needed for route guidance.

Although a form in which the CAN 50 based on a CAN protocol is used as a network inside the vehicle 10 has been described, a bus other than a CAN, such as a bus using an Ethernet (Registered Trademark) protocol, may be used instead of the CAN 50. Although various devices or equipment other than the above-described devices or equipment are mounted in the vehicle 10, in FIG. 1, constituent elements particularly related to the embodiment are extracted and shown.

The vehicle 10 is, for example, a hybrid vehicle (HV), a plug-in hybrid vehicle (PHV), an electric vehicle (EV), a gasoline vehicle, a diesel vehicle, or the like. The navigation ECU 100 is mounted in the vehicle 10.

The navigation ECU 100 performs control of a navigation system mounted in the vehicle 10. The navigation ECU 100 includes an image transmission device of the embodiment. Here, description will be provided focusing on a portion relating to the image transmission device in the navigation ECU 100.

The navigation ECU 100 is implemented by a computer including a central processing unit (CPU), a random access memory (RAM), a read only memory (ROM), a hard disk drive (HDD), an input/output interface, a communication interface, an internal bus, and the like as an example.

A program that makes the computer as the navigation ECU 100 have a function as an image transmission device is installed on the computer through a computer-readable storage medium or is downloaded from another computer system through a modem or the like connected to the network 400, such as the Internet, and installed on the computer.

The navigation ECU 100 includes a main controller 110, a position detection unit 120, an intersection detection unit 130, a route search unit 140, an information acquisition unit 150, an acquisition need determination unit 160, an imaging controller 170, a communication controller 180, and a memory 190. The main controller 110, the position detection unit 120, the intersection detection unit 130, the information acquisition unit 150, the acquisition need determination unit 160, the imaging controller 170, and the communication controller 180 represent the functions of the program executed by the navigation ECU 100 as functional blocks. The memory 190 functionally represents a portion that stores data like the RAM, the ROM, and the HDD included in the navigation ECU 100. The information acquisition unit 150, the acquisition need determination unit 160, and the imaging controller 170 constitute an image acquisition unit 101.

In the navigation ECU 100, at least the information acquisition unit 150, the acquisition need determination unit 160, the imaging controller 170, the communication controller 180, and the memory 190 constitute the image transmission device. The image transmission device may further include the main controller 110, the position detection unit 120, or the intersection detection unit 130.

The main controller 110 is a processing unit that performs processing other than processing performed by the position detection unit 120, the intersection detection unit 130, the information acquisition unit 150, the acquisition need determination unit 160, the imaging controller 170, and the communication controller 180, and integrates processing of the navigation ECU 100.

The position detection unit 120 is connected to a global positioning system (GPS) antenna, and acquires position data and time data from GPS signals. The position data acquired by the position detection unit 120 is data representing a current position (latitude and longitude) of the vehicle 10, and the time data is data representing a current time. The position data and the time data are used for processing that is performed by the main controller 110, and are output to the CAN 50.

The intersection detection unit 130 detects an intersection in a moving direction of the vehicle based on the current position of the vehicle and map data (electronic map). Specifically, the intersection detection unit 130 acquires the current position of the vehicle obtained from the navigation system and detects an intersection represented by a node in the moving direction on a link representing a road including the current position in the map data.

The intersection detection unit 130 calculates a distance to the intersection based on the current position (latitude and longitude) of the vehicle obtained from the navigation system and a position (latitude and longitude) of the intersection represented by the node in the moving direction on the link representing the road, on which the vehicle is traveling currently, in the map data.

The route search unit 140 receives information, such as a destination input to the navigation system by a user of the vehicle 10 and transmits information, such as the destination, and the position data representing the current position of the vehicle 10 to the navigation server 500B. The route search unit 140 fits data of route guidance received from the navigation server 500B to the map data and displays the data on a display of the navigation system. At this time, the route search unit 140 displays a signboard guide image received from the navigation server 500B on the side of an image of the intersection on the display, and displays guide display, such as "turn left at a OO intersection" on the display. As described above, since the navigation server 500B searches for a route, it is possible to guide a more accurate route and a more accurate arrival time.

The information acquisition unit 150 acquires information, such as a facility, at the intersection from the map data stored in the memory 190. Information, such as a facility, is point of interest (POI) information. The POI information represents an identifier (ID), a name, a category (genre), and a position (latitude and longitude) of a store, a facility, or the like along a road included in the map data. A facility or the like is an example of a mark target that faces an intersection and can become a mark.

The acquisition need determination unit 160 determines an acquisition need of an image relating to an intersection for the camera 200 based on whether or not the POI information satisfies a predetermined condition that the camera 200 is not caused to perform imaging. The reason for determining the acquisition need of the image as described above is as follows; in a case where an image relating to an intersection is acquired by a probe traffic information collection function of the navigation ECU 100 without determining the acquisition need of the image relating to the intersection, the number of images to be acquired may increase, the data capacity of image data uploaded from the navigation ECU 100 to the probe storage server 500A may become enormous, and the capacity of image data stored in the probe storage server 500A and the navigation server 500B becomes also enormous. In order to restrain the data capacity of image data uploaded in the above-described case or the capacity of image data stored in the probe storage server 500A and the navigation server 500B from becoming enormous, the acquisition need of the image is determined.

In a case where the POI information satisfies the predetermined condition, the acquisition need determination unit 160 determines that acquisition of the image relating to the intersection by the camera 200 is not needed, strictly selecting an image uploaded to the probe storage server 500A and the navigation server 500B, and restrains the data capacity of image data uploaded and the capacity of image data stored in the probe storage server 500A and the navigation server 500B from becoming enormous.

In a case where the acquisition need determination unit 160 determines that acquisition of the image relating to the intersection is needed, the imaging controller 170 causes the camera 200 to perform imaging and acquires the image relating to the intersection. The image relating to the intersection is an image of a facility or the like to be a mark of the intersection in probe data (data, such as position data, the degree of congestion, a vehicle speed, and images, obtained when the vehicle travels actually) collected by the probe traffic information collection function. A way of selecting the image of the facility or the like to be a mark of the intersection will be described below along with the predetermined condition.

The communication controller 180 causes the DCM 300 to transmit the image relating to the intersection acquired by the imaging controller 170 to the probe storage server 500A. The communication controller 180 is an example of a transmission controller.

The memory 190 stores the map data, the image transmission program, data needed for executing the image transmission program, and the like. The memory 190 is an example of a storage unit.

The camera 200 is an example of an imaging unit that captures around the vehicle 10 to acquire an image. A single or a plurality of cameras 200 may be provided as long as images in front of and on the side of the vehicle 10 can be acquired. The camera 200 may be configured to acquire an image behind the vehicle in addition to the images in front of and on the side of the vehicle 10.

The DCM 300 is an example of a communication unit or a wireless communication device that is mounted in the vehicle 10, and for example, performs wireless communication through a communication line, such as 3G, LTE, 4G, or 5G. The DCM 300 can be connected to a network 400, such as the Internet, through the above-described communication line. With the above description, the navigation ECU 100 can perform data communication through the network 400. As an example, hereinafter, it is assumed that the DCM 300 performs wireless communication through 4G.

The probe storage server 500A is a server that collects and stores the probe data uploaded from the navigation ECU 100 of the vehicle 10 through the DCM 300. The probe storage server 500A has a controller 510A, a communication unit 511A, a probe controller 512A, and a signboard guide creation unit 513A. The probe storage server 500A is connected to a traveling database (DB) 600A.

The controller 510A is implemented by a computer including a CPU, a RAM, a ROM, an HDD, an input/output interface, a communication interface, an internal bus, and the like. The communication unit 511A, the probe controller 512A, and the signboard guide creation unit 513A of the controller 510A represent the functions of the program executed by the controller 510A as functional blocks.

The communication unit 511A is a communication interface that is connected to the network 400. The probe storage server 500A is connected to the network 400 through the communication unit 511A, and performs wireless data communication with the navigation ECU 100 of the vehicle 10. Although one vehicle 10 is shown in FIG. 1, since there is actually a plurality of vehicles 10, the communication unit 511A performs wireless data communication with the navigation ECUs 100 of the vehicles 10.

The probe controller 512A stores the probe data (data, such as position data, the degree of congestion, the vehicle speed, and images, obtained when the vehicle 10 travels actually) uploaded from the navigation ECU 100 of the vehicle 10 in the traveling DB 600A.

The signboard guide creation unit 513A recognizes the image of the facility or the like to be a mark of the intersection in the probe data stored in the traveling DB 600A by the probe controller 512A through image processing, and stores the image in the signboard guide DB 600B.

The navigation server 500B is a server that searches for a route and calculates a predicted arrival time according to a request from the navigation ECU 100 of the vehicle 10, and that transmits data of the searched route, the predicted arrival time, and the image of the facility or the like to be a mark of the intersection included in the searched route to the navigation ECU 100 of the vehicle 10.

The navigation server 500B has a controller 510B, a communication unit 511B, a route search unit 512B, and a route guidance unit 513B.

The controller 510B is implemented by a computer including a CPU, a RAM, a ROM, an HDD, an input/output interface, a communication interface, an internal bus, and the like. The communication unit 511B, the route search unit 512B, and the route guidance unit 513B of the controller 510B represent the functions of the program executed by the controller 510B as functional blocks.

The communication unit 511B is a communication interface that is connected to the network 400. The navigation server 500B is connected to the network 400 through the communication unit 511B, and performs wireless data communication with the navigation ECU 100 of the vehicle 10. Although the single vehicle 10 is shown in FIG. 1, since there is actually a plurality of vehicles 10, the communication unit 511B performs wireless data communication with the navigation ECUs 100 of the vehicles 10.

The route search unit 512B performs communication with the navigation ECU 100 of the vehicle 10, and searches for the route and calculates the predicted arrival time based on information of a destination or the like transmitted from the route search unit 140 and the position data. The route search unit 512B transmits data representing the calculated searched route and the predicted arrival time to the navigation ECU 100 of the vehicle 10.

The route guidance unit 513B reads data of the image of the facility or the like to be a mark of the intersection associated with a node included in the searched route from the signboard guide DB 600B, and transmits the read data to the navigation ECU 100 of the vehicle 10 along with data representing the searched route and the calculated predicted arrival time.

Figure 2A:
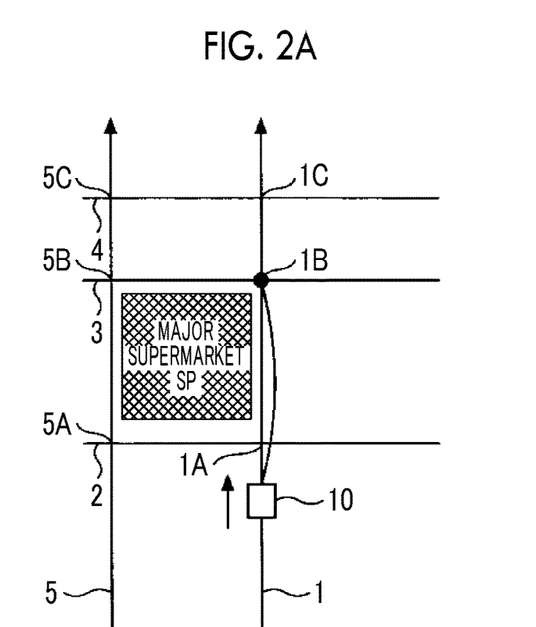
FIG. 2A is a diagram showing the positional relationship of roads, intersections, and a major supermarket.
Figure 2B:
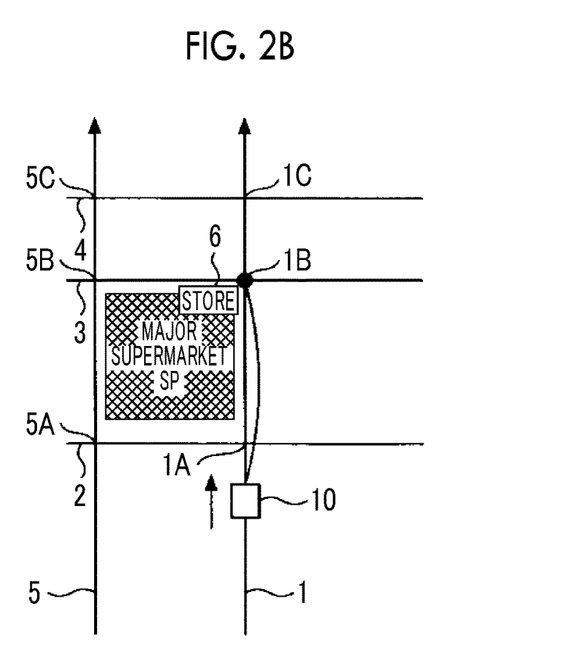
FIG. 2B is a diagram showing the positional relationship of roads, intersections, and a major supermarket.
Figure 2C:
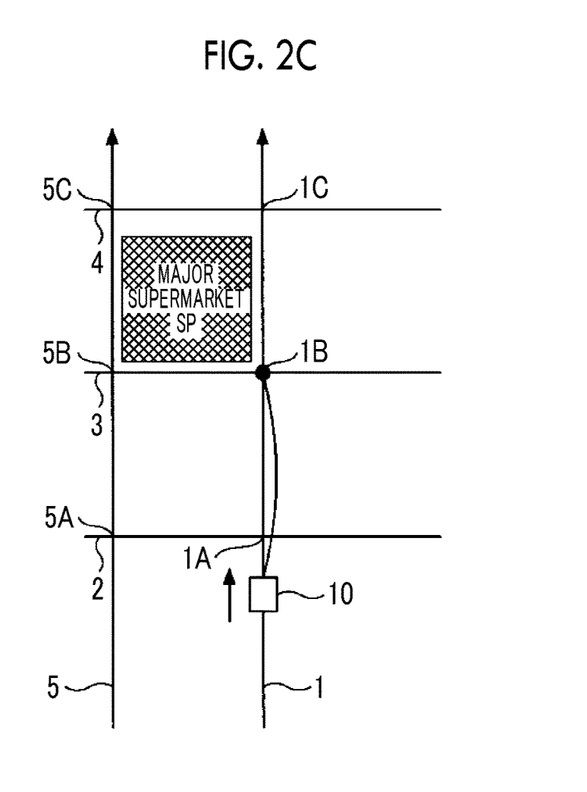
FIG. 2C is a diagram showing the positional relationship of roads, intersections, and a major supermarket.

The predetermined condition in selecting the image of the facility or the like to be a mark of the intersection will be described. FIGS. 2A to 2C are diagrams showing the positional relationship of roads, intersections, and a major supermarket. FIGS. 2A to 2C schematically show display on the display of the navigation system. Here, as an example, it is assumed that the vehicle 10 is traveling in a left-hand traffic country or area.

In FIGS. 2A to 2C, the vehicle 10 is moving in a direction (upward direction in the drawing) indicated by an arrow along a road 1. In the moving direction of the vehicle 10, there are roads 2, 3, 4 that cross the road 1. There is a road 5 that is parallel to the road 1. The road 5 is positioned on the left side by one block from the road 1 in the moving direction of the vehicle 10. The road 1 and the roads 2, 3, 4 cross each other at intersections 1A, 1B, 1C. The road 5 and the roads 2, 3, 4 cross each other at intersections 5A, 5B, 5C. The roads 1, 2, 3, 4, 5 are represented by links of the map data, and have unique IDs, respectively. The intersections 1A, 1B, 1C, 5A, 5B, 5C are represented by nodes of the map data, and have unique IDs, respectively.

As an example, in a case where the vehicle 10 approaches a position 300 m before an intersection, an image transmission device 100 of the vehicle 10 calculates a distance to the intersection based on the latitude and longitude of a node representing the intersection and the latitude and longitude representing a current position of the vehicle 10. The detection of the intersection and the calculation of the distance are performed by the intersection detection unit 130.

Then, the image transmission device 100 reads a POI of a facility or the like having data of the same latitude and longitude as the latitude and longitude of the node representing the intersection or a POI of a facility or the like having data of the latitude and longitude with a difference in latitude and longitude from the node representing the intersection equal to or less than a predetermined value from the memory 190, and determines the type of facility based on a name and a category (genre) of the facility or the like represented by the POI.

Reading the POI as described above is to estimate a facility facing the intersection. Facing the intersection refers to that a facility is positioned at a corner of the intersection or a facility is at a position, not a corner, facing the intersection like an end portion of a T-shaped road. The predetermined value of the difference in latitude and longitude refers to a difference that may be generated in a case where the latitude and longitude of the node representing the intersection are different from the latitude and longitude of the POI of the facility or the like facing the intersection.

In a case where there is the POI of the facility or the like facing the intersection as described above, the image transmission device 100 determines the need for acquisition of an image of the facility or the like represented by the POI in the following manner. Here, although a case where the image transmission device 100 determines the need for image acquisition to a facility facing the intersection 1B will be described, the same applies to facilities facing the intersections 1A, 1C, 5A, 5B, 5C.

Here, although the image transmission device 100 determines not to acquire an image of a facility or the like on the right side of the intersection 1B of the left-hand traffic road 1 since there is a possibility that the visual field of the camera 200 is obstructed by a vehicle traveling on an oncoming lane, a median, a roadside tree, or the like, the image transmission device 100 determines the need for image acquisition as follows to a facility or the like at the left front corner of the intersection 1B in order to restrain the data capacity of uploaded image data and the capacity of image data stored in the probe storage server 500A and the navigation server 500B from becoming enormous.

As shown in FIG. 2A, it is assumed that there is a major supermarket SP of a famous chain on the left front side of the intersection 1B. The user of the vehicle 10 easily views the vehicle 10 traveling on the left-hand traffic road 1, and the major supermarket SP on the left front side of the intersection 1B in front of the vehicle 10 easily comes into the field of view. The major supermarket SP is a large supermarket that occupies one block surrounded by the roads 1, 2, 3, 5. It is assumed that one block is 200 m square as an example. The major supermarket SP described above is conspicuous to the user of the vehicle 10. One block is a block of the minimum range divided by a plurality of roads. The roads dividing one block are roads included in the map data (electronic map).

Here, determination about whether or not one block is large may be made by reading the size of one block from the map data stored in the memory 190 with the acquisition need determination unit 160 of the image transmission device 100, and determining whether or not one block at the left front corner of the intersection is equal to or greater than, for example, 200 m square.

Determination about whether or not the major supermarket SP occupies one large block may be made by reading the size of a facility or the like represented by a POI for one block understood as one large block from the map data stored in the memory 190 with the acquisition need determination unit 160, and determining whether or not the facility or the like represented by the POI occupies one block.

The major supermarket SP is known to many users and becomes a mark easy to understand. In particular, the major supermarket SP occupying one block is conspicuous, and there is a high probability that the major supermarket SP is recognized by the user even though an image is not acquired. For this reason, the image transmission device 100 determines that acquisition of the image of the major supermarket SP occupying one block on the left front side of the intersection 1B is not needed in order to reduce the capacity of uploaded image data or stored image data. The determination described above is performed by the acquisition need determination unit 160. Here, although a case where the facility or the like occupying one block is the major supermarket SP has been described, determination that acquisition of an image is not needed as described above is not limited to a large facility, such as the major supermarket SP, and may be made to a large facility or the like other than the major supermarket SP. For example, a large department store, factory, hotel, or the like may be applied.

In FIG. 2A, although a form in which, in a case where a large facility, such as the major supermarket SP, at the left front corner of the intersection occupies one block, determination is made that acquisition of an image is not needed has been described, even though a facility does not occupy one block, in a case where a facility occupies a predetermined ratio or more of one block at the left front corner of the intersection, determination may be made that acquisition of an image is not needed. This is because a facility or the like having the ratio occupying one block equal to or greater than the predetermined ratio is a conspicuous facility. A facility or the like having an occupancy ratio less than a given ratio is an inconspicuous facility or the like.

For example, the predetermined ratio may be set to 50%, and in determining whether or not a facility occupies an area of 50% or more of one block, the acquisition need determination unit 160 may calculate the area of one block and the area of a large facility, such as the major supermarket SP, from the map data, may determine whether or not the area ratio is equal to or greater than 50%, and in a case where the area ratio is equal to or greater than 50%, may determine that acquisition of an image is not needed. For this reason, an image of an inconspicuous facility or the like having the area ratio less than 50% is uploaded to the probe storage server 500A. The predetermined ratio may be set to an appropriate value, and is preferably equal to or greater than 50%.

Calculating the area of one block from the map data may be regarded as calculating the land area of one block, and calculating an occupied area of a facility or the like in one block may be regarded as calculating an occupied land area of a facility or the like in one block.

In FIG. 2B, in a case where a facility, such as a store 6, different from the major supermarket SP is disposed at the left front corner of the intersection 1B of the major supermarket SP shown in FIG. 2A, the store 6 is smaller than the major supermarket SP, the major supermarket SP is conspicuous to the user, and there is a probability that the store 6 is recognized by the user even though an image is not acquired; thus, the image transmission device 100 determines that acquisition of the image of the major supermarket SP occupying one block on the left front side of the intersection 1B is not needed in order to reduce the capacity of uploaded image data or stored image data.

As shown in FIG. 2C, it is assumed that there is the major supermarket SP in one large block on the left back side of the intersection 1B. One large block on the left back side of the intersection 1B is a block surrounded by the roads 1, 3, 4, 5. Here, the term "large" has the same meaning as in FIGS. 2A and 2B.

In a case where the major supermarket SP that is disposed substantially over one large block is positioned in one large block on the left back side of the intersection 1B, the major supermarket SP hardly becomes a mark compared to a case where the major supermarket SP is positioned at the left front corner of the intersection 1B as shown in FIGS. 2A and 2B. This is because the major supermarket SP is too large, and thus, is hardly conspicuous compared to a case where the major supermarket SP is positioned at the left front corner of the intersection 1B. For this reason, the image transmission device 100 determines that acquisition of the image of the major supermarket SP in one block on the left back side of the intersection 1B is needed. The determination described above is performed by the acquisition need determination unit 160. In FIG. 2C, although the major supermarket SP has been described, the same applies to a large facility, such as a large department store, factory, or hotel.

Figure 3:
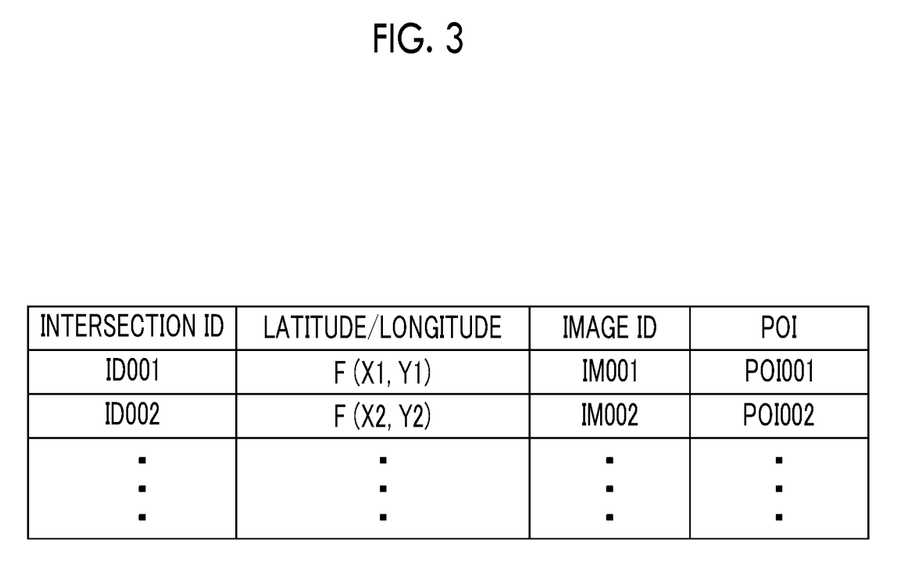
FIG. 3 is a diagram showing the data structure of a database having an intersection ID, a latitude/longitude, an image ID, and a POI associated with one another.

FIG. 3 is a diagram showing the data structure of a database having an intersection ID, a latitude/longitude, an image ID, and a POI associated with one another. The intersection ID is an ID of an intersection (node) included in the map data. The latitude/longitude represents the latitude and longitude of each intersection. The image ID indicates an ID of an image acquired at each intersection. The POI is a POI of a facility or the like included in the image represented by the image ID. FIG. 3 shows the data structure of data stored in the navigation server 500B.

When the image transmission device 100 determines that acquisition of an image is needed, an image of a large facility or the like is stored in the memory 190 as a part of the probe data, is uploaded to the probe storage server 500A, and is stored in the navigation server 500B.

Figure 4:
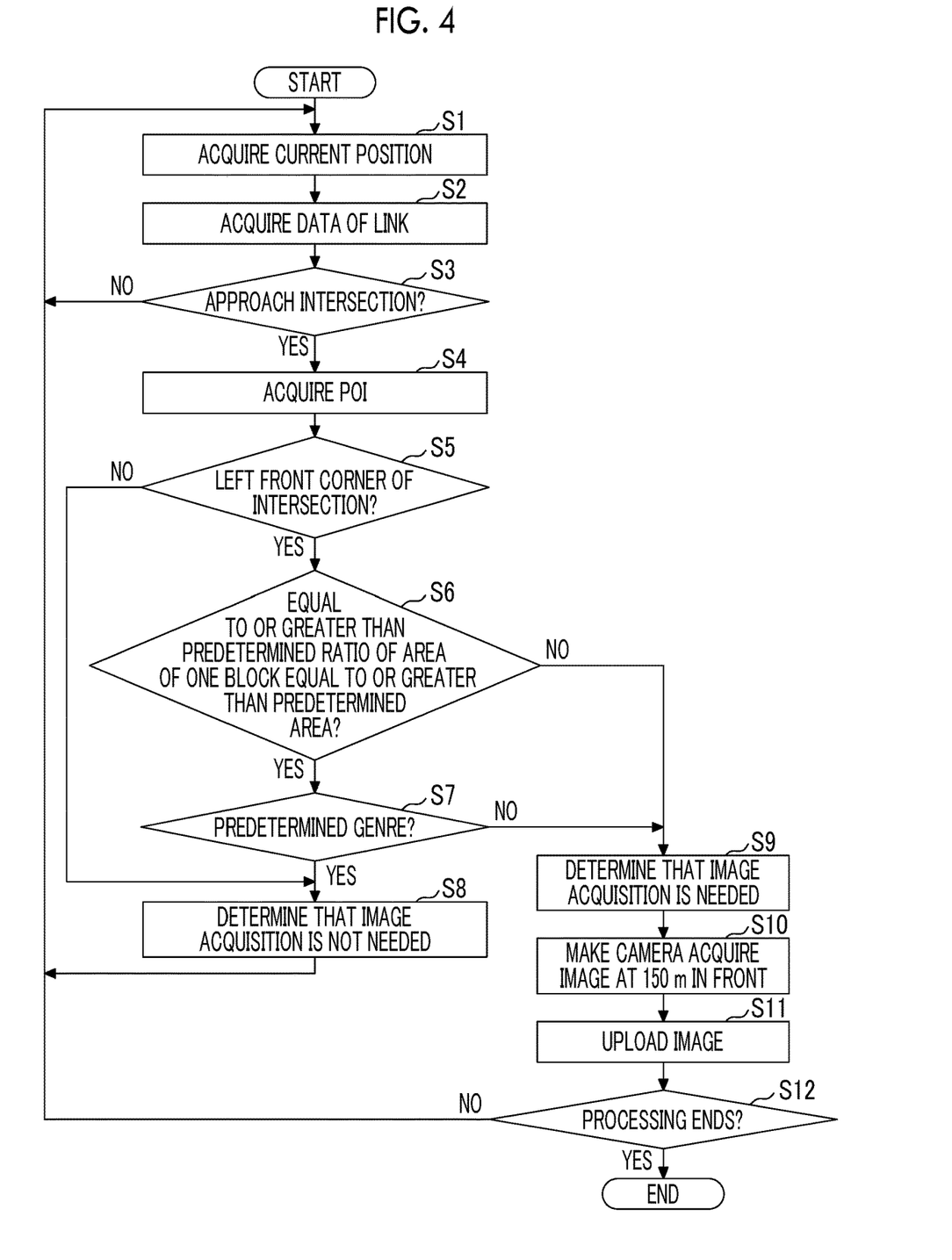
FIG. 4 is a flowchart showing processing that is performed by an image transmission device.

FIG. 4 is a flowchart showing processing that is performed by the image transmission device 100.

As an example, in a case where an ignition switch is turned on, the main controller 110 starts the processing (START).

The position detection unit 120 acquires the current position of the vehicle 10 (Step S1).

The main controller 110 acquires data of a link (road) including the current position of the vehicle 10 (Step S2).

The intersection detection unit 130 determines whether or not the vehicle 10 approaches an intersection in the moving direction (Step S3). Determination about whether or not the vehicle 10 approaches the intersection may be performed by acquiring the position (latitude, longitude) of the intersection (node) in the moving direction from the map data, calculating the distance between the current position of the vehicle 10 and the intersection, and determining whether or not the distance between the current position and the intersection is equal to or shorter than 300 m.

In a case where the intersection detection unit 130 determines that the vehicle 10 approaches the intersection (S3: YES), the information acquisition unit 150 acquires a POI of a facility or the like at the intersection from the map data stored in the memory 190 (Step S4).

The acquisition need determination unit 160 determines whether or not the facility or the like represented by the POI is at the left front corner of the intersection (Step S5). Determination about whether or not the facility is at the left front corner of the intersection may be performed by determining whether or not the position of the POI is at the left front corner with respect to the position (latitude, longitude) of the intersection acquired in Step S3.

In the processing of Step S5, in a case where the left back corner, the right corner (right front corner or right back corner) or the right side of the intersection is the end, a POI of a facility or the like facing the right side of the intersection is excluded from an image acquisition target.

In a case where determination is made that the facility or the like represented by the POI is at the left front corner of the intersection (S5: YES), the acquisition need determination unit 160 calculates the area of one block where the facility or the like represented by the POI is positioned and the area of the facility or the like represented by the POI from the map data stored in the memory 190, and determines whether or not the area of one block is equal to or greater than a predetermined area and the area of the facility or the like represented by the POI is equal to or greater than the predetermined ratio of the area of one block (Step S6).

In a case where determination is made the area of one block is equal to or greater than the predetermined area and the area of the facility or the like represented by the POI is equal to or greater than the predetermined ratio of the area of one block (S6: YES), the acquisition need determination unit 160 determines whether or not the facility or the like represented by the POI is a predetermined genre (Step S7). The predetermined genre used in Step S7 may be determined in advance and stored in the memory 190. The predetermined genre is, for example, a major supermarket, a department store, a factory, a hotel, or the like.

In a case where determination is made that the facility is the predetermined genre (S7: YES), the acquisition need determination unit 160 determines that acquisition of the image of the facility or the like represented by the POI is not needed (Step S8). In a case where the processing of Step S8 ends, the main controller 110 returns the flow to Step S1.

In a case where determination is made that the facility or the like represented by the POI is not a predetermined genre (S7: NO), the acquisition need determination unit 160 determines that acquisition of the image of the facility or the like represented by the POI is needed (Step S9). This is because an image of a facility or the like other than the predetermined genre is acquired.

The imaging controller 170 causes the camera 200 to acquire an image from a position 150 m before the intersection (Step S10). The camera 200 captures an image, for example, at every 10 m, and the imaging controller 170 performs image processing for object recognition about whether or not an object, such as a building, is included in the image and selects an image including an object, such as a building, as an image for upload. The route search unit 140 may perform communication with the probe storage server 500A and may acquire position data representing a position where an image should be acquired from the probe storage server 500A, and when the vehicle 10 arrives at the position represented by the position data, the imaging controller 170 may cause the camera 200 to acquire an image.

The processing to Step S8 through Step S4, Step S5: YES, Step S6: YES, and Step S7: YES is processing that is performed by an image acquisition unit 101 constituted by the information acquisition unit 150, the acquisition need determination unit 160, and the imaging controller 170. The processing to Step S9 through Step S4, Step S5: YES, Step S6: YES, and Step S7: NO is processing that, in a case where the occupancy ratio of the occupancy area of the mark target at the intersection in the block to the area of the block is equal to or less than the given ratio, the image acquisition unit 101 causes the camera 200 to acquire the image of the intersection including the mark target.

The main controller 110 causes the communication controller 180 to upload the image to the probe storage server 500A (Step S11). In the processing of Step S11, the probe data other than the image is also uploaded to the probe storage server 500A along with the image. With the above description, the probe storage server 500A receives the probe data from the image transmission device 100.

The main controller 110 determines whether or not to end the processing (Step S12). A case of ending the processing is, for example, when the ignition switch is turned off. With the above, a sequence of processing ends.

In Step S3, in a case where the intersection detection unit 130 determines that the vehicle 10 does not approach the intersection (S3: NO), the main controller 110 returns the flow to Step S1.

In a case where the acquisition need determination unit 160 determines that the facility or the like represented by the POI is not at the left front corner of the intersection (S5: NO), the flow progresses to Step S8, and determination is made that acquisition of the image of the facility or the like represented by the POI is not needed (Step S8). This is because there is no need for acquisition of the image of the facility or the like at the left back corner of the intersection or on the right side of the intersection.

In a case where determination is made that the area of one block is equal to or greater than the predetermined area and the area of the facility or the like represented by the POI is not equal to or greater than the predetermined ratio of the area of one block (S6: NO), the acquisition need determination unit 160 determines that acquisition of the image of the facility or the like represented by the POI is needed (Step S9). This is because an image of a facility or the like having the area of one block at the left front corner of the intersection less than the predetermined area or the area of the facility or the like represented by the POI less than the predetermined ratio of the area of one block is acquired.

Figure 5:
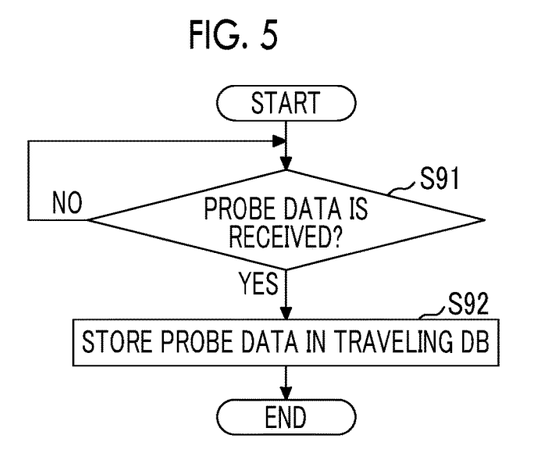
FIG. 5 is a flowchart showing processing that is performed by a probe controller of the probe storage server.

FIG. 5 is a flowchart showing processing that is performed by the probe controller 512A of the probe storage server 500A. In a case where the processing starts (START), the probe controller 512A determines whether or not the probe data is received from the image transmission device 100 (Step S91).

In a case where determination is made that the probe data is received (S91: YES), the probe controller 512A stores the probe data in the traveling DB 600A (Step S92). In a case where determination is made that the probe data is not received (S91: NO), the probe controller 512A repeatedly performs the processing of Step S91. With the above, the processing for one cycle of a control cycle ends (END). The probe controller 512A repeatedly performs the processing from START to END in a predetermined control cycle.

Figure 6:
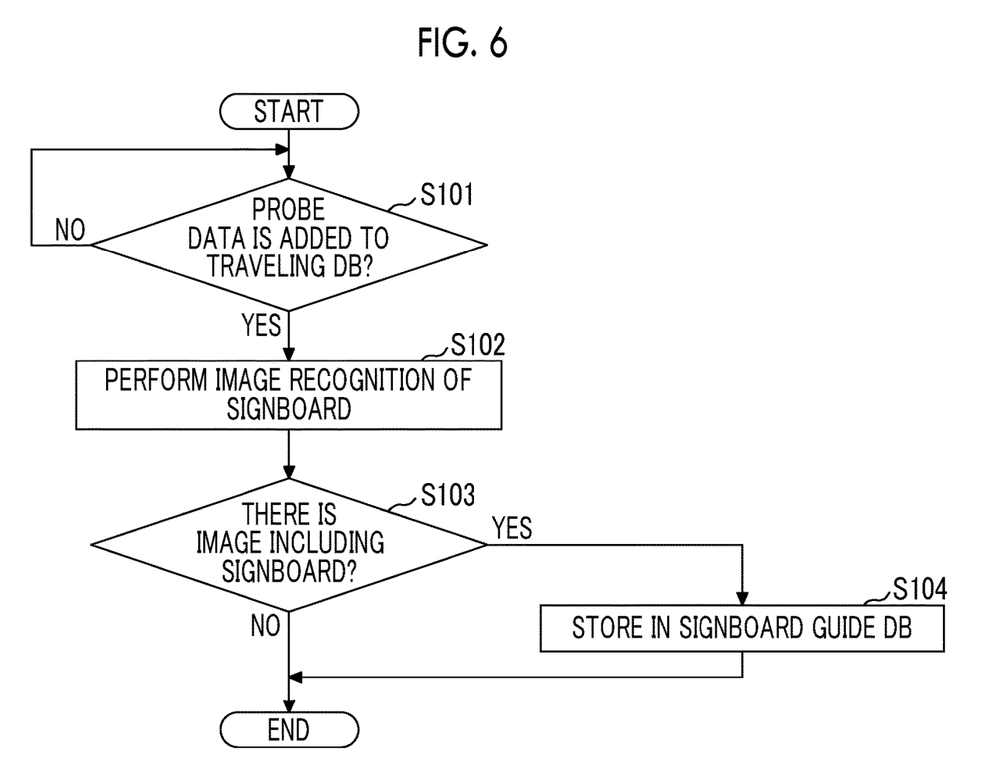
FIG. 6 is a flowchart showing processing that is performed by a signboard guide creation unit of the probe storage server.

FIG. 6 is a flowchart showing processing that is performed by the signboard guide creation unit 513A of the probe storage server 500A. In a case where the processing starts (START), the signboard guide creation unit 513A determines whether or not probe data is added to the traveling DB 600A (Step S101).

In a case where determination is made that the probe data is added (S101: YES), the signboard guide creation unit 513A performs image recognition of a signboard to image data included in the probe data (Step S102). The image recognition of the signboard is processing for performing recognition processing (image processing) about whether or not a character, a number, or the like is included in the image data transmitted from the image transmission device 100.

The signboard guide creation unit 513A determines whether or not there is an image including a signboard in the processing of Step S102 (Step S103).

In a case where determination is made that there is an image including a signboard (S103: YES), the signboard guide creation unit 513A stores the image in the signboard guide DB 600B along with the intersection ID, the latitude/longitude, the image ID, and the POI (Step S104). With the above description, new data is added to the database shown in FIG. 3.

In a case where the signboard guide creation unit 513A ends the processing of Step S104 or in a case where the signboard guide creation unit 513A determines in Step S103 that there is no image including a signboard (S103: NO), the processing for one cycle of a control cycle ends (END). The signboard guide creation unit 513A repeatedly performs the processing from START to END in a predetermined control cycle.

As described above, according to the embodiment, in a case where, in regard to the block where the facility or the like represented by the POI at the left front corner of the intersection in the moving direction of vehicle 10 is positioned, the area of one block is equal to or greater than the predetermined area and the area of the facility or the like represented by the POI is equal to or greater than the predetermined ratio of the area of one block, acquisition of an image is suppressed; thus, it is possible to restrain the data capacity of uploaded image data or the capacity of image data stored in the probe storage server 500A and the navigation server 500B from becoming enormous.

Accordingly, it is possible to provide the non-transitory storage medium storing the image transmission program and the image transmission device 100 capable of efficiently collecting an image at an intersection.

Although the processing in a case where the vehicle 10 travels on the left-hand traffic road has been described above, in a case where the vehicle 10 travels on the right-hand traffic road, the right and left in the above processing may be replaced with each other.

Although a form in which the route search unit 140 displays the signboard guide image received from the navigation server 500B on the side of the image of the intersection on the display of the navigation system has been described above, the following may be performed instead of displaying the signboard guide image or in addition to displaying the signboard guide image. The navigation server 500B may perform at least one of image processing and character recognition processing to the signboard guide image to identify a facility name or the like represented by the signboard guide image and may display the identified facility name or the like on the display or read out the facility name through voice guidance.

Although the non-transitory storage medium storing the image transmission program, the image transmission device, and the image transmission method according to the exemplary embodiment of the disclosure have been described above, the disclosure is not limited to the embodiment that is specifically disclosed, and various modifications or alterations can be made without departing from the spirit and scope of the disclosure.

What is claimed is:

1. An image transmission device comprising:
a communication interface configured to:
transmit a captured image of a mark target that faces an intersection to a server in a case where the mark target is inconspicuous; and
not transmit the image that faces the intersection to the server in a case where the mark target is conspicuous.

2. The image transmission device according to claim 1, wherein the case where the mark target is inconspicuous is a case where a ratio of a size of the mark target with respect to a size of a block defined by roads is less than a given threshold.

3. The image transmission device according to claim 2, wherein the communication interface is configured not to transmit an image of the mark target in a case where the ratio is equal to or greater than the given threshold.

4. The image transmission device according to claim 2, wherein the communication interface is configured not to transmit an image relating to the intersection in a case where the mark target occupies an entire area of the block.

5. The image transmission device according to claim 1, wherein the captured image includes the mark target at a place between a position in front of the intersection by a predetermined distance and the intersection.

6. The image transmission device according to claim 2, wherein the ratio is determined using map data.

7. The image transmission device according to claim 1, wherein the communication interface is configured not to transmit an image of the mark target in a case where the mark target is a predetermined large facility.

8. The image transmission device according to claim 2, wherein the block is positioned at a left front corner of the intersection in left-hand traffic or at a right front corner of the intersection in right-hand traffic.

9. An image transmission method comprising;
transmitting, by a communication interface, a captured image of a mark target that faces an intersection to a server in a case where the mark target is inconspicuous; and
not transmitting, by the communication interface, the image that faces the intersection to the server in a case where the mark target is conspicuous.

10. The image transmission method according to claim 9, wherein the case where the mark target is inconspicuous is a case where a ratio of a size of the mark target with respect to a size of a block defined by roads is less than a given threshold.

11. The image transmission method according to claim 10, further comprising not transmitting an image of the mark target in a case where the ratio is equal to or greater than the given threshold.

12. The image transmission method according to claim 10, further comprising not transmitting an image relating to the intersection in a case where the mark target occupies an entire area of the block.

13. The image transmission method according to claim 9, wherein the captured image includes the mark target at a place between a position in front of the intersection by a predetermined distance and the intersection.

14. The image transmission method according to claim 10, wherein the ratio is determined using map data.

15. The image transmission method according to claim 9, further comprising not transmitting an image of the mark target in a case where the mark target is a predetermined large facility.

16. The image transmission method according to claim 10, wherein the block is positioned at a left front corner of the intersection in left-hand traffic or at a right front corner of the intersection in right-hand traffic.

17. A server comprising:
a communication interface; and
a processor configured to:
determine whether there is an image including a signboard in an image of a mark target facing an intersection when the communication interface receives the image, the image transmitted by an image transmission device in a case where the mark target is inconspicuous and not transmitted by the image transmission device in a case where the mark target is conspicuous, and
store the image in a database.

18. The server according to claim 17, wherein the case where the mark target is inconspicuous is a case where a ratio of a size of the mark target with respect to a size of a block, facing the intersection and defined by roads, is less than a given threshold.

19. The server according to claim 17, wherein the image includes the mark target at a place between a position in front of the intersection by a predetermined distance and the intersection.

20. The server according to claim 18, wherein the ratio is determined using map data.

* * * * *